Figure 1D:
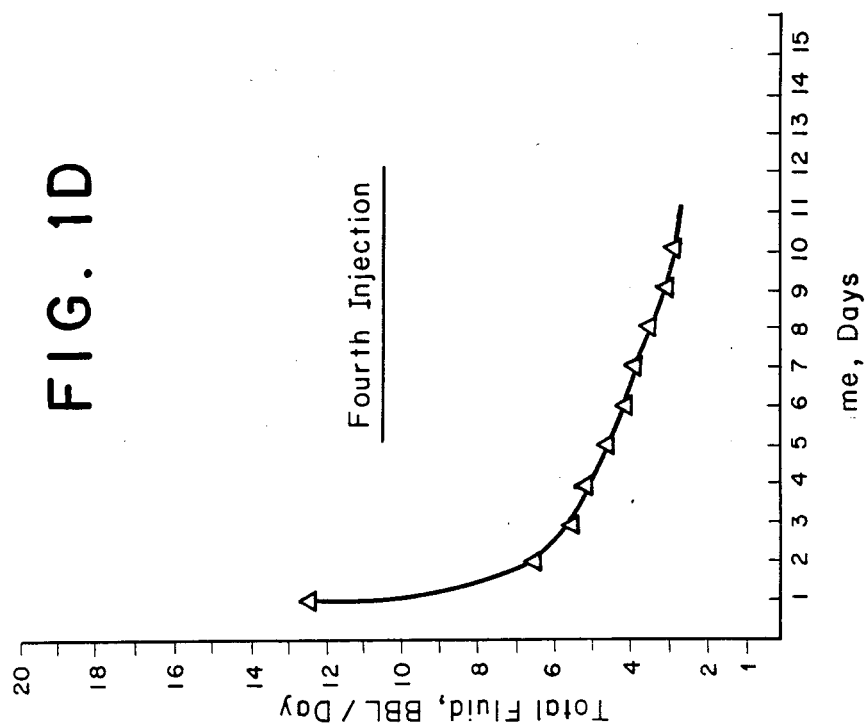

United States Patent [19]

Hayes et al.

[11] Patent Number: 4,706,749
[45] Date of Patent: Nov. 17, 1987

[54] METHOD FOR IMPROVED OIL RECOVERY

[75] Inventors: Michael E. Hayes, Fernandina Beach; Gary R. Hass, Amelia Island; Robert Sharpe, Fernandina Beach, all of Fla.; Eirik Nestaas, Chestnut Hill; Mikhail V. Ostrovsky, Acton, both of Mass.

[73] Assignee: Petroleum Fermentations N.V., Willemstad, Netherlands Antilles

[21] Appl. No.: 668,783

[22] Filed: Nov. 6, 1984

[51] Int. Cl.$^4$ .................. E21B 43/22; E21B 43/34
[52] U.S. Cl. .................. 166/267; 166/275; 166/305.1
[58] Field of Search .................. 166/263, 267, 305.1, 166/275, 274

[56] References Cited

U.S. PATENT DOCUMENTS

| | | | |
|---|---|---|---|
| 2,288,857 | 7/1942 | Subkow | 166/263 |
| 3,131,759 | 5/1964 | Slusser et al. | 166/305.1 |
| 3,332,482 | 7/1967 | Trantham . | |
| 3,373,809 | 3/1968 | Cooke, Jr. | 166/273 |
| 3,380,531 | 4/1968 | McAuliffe et al. . | |
| 3,402,770 | 9/1968 | Messenger . | |
| 3,454,095 | 7/1969 | Messenger et al. . | |
| 3,459,265 | 8/1969 | Buxton et al. . | |
| 3,467,195 | 9/1969 | McAuliffe et al. . | |
| 3,474,864 | 10/1969 | Hurd . | |
| 3,493,051 | 2/1970 | Gogarty | 166/305 R |
| 3,537,523 | 11/1970 | Gogarty et al. | 166/305 R |
| 3,581,822 | 6/1971 | Cornelius . | |
| 3,618,666 | 11/1971 | Sayers . | |
| 3,620,303 | 11/1971 | Halbert, Jr. | 166/274 |
| 3,693,719 | 9/1972 | Sample, Jr. et al. . | |
| 3,782,472 | 1/1974 | Siess, Jr. . | |
| 3,885,628 | 5/1975 | Reed et al. | 166/274 |
| 3,924,683 | 12/1975 | George et al. . | |
| 3,951,457 | 4/1976 | Redford . | |
| 3,981,361 | 9/1976 | Healy | 166/274 |
| 4,125,156 | 11/1978 | Glinsmann | 166/274 |
| 4,261,812 | 4/1981 | Newcombe | 166/267 |
| 4,278,129 | 7/1981 | Walton | 166/263 |
| 4,362,213 | 12/1982 | Tabor . | |
| 4,405,015 | 9/1983 | McCoy et al. | 166/267 |
| 4,407,367 | 10/1983 | Kydd . | |
| 4,490,263 | 12/1984 | Stapp et al. | 166/273 |

OTHER PUBLICATIONS

Healy and Reed, "Physiocochemical Aspects of Microemulsion Flooding", Soc. Petr. Eng. J., Oct. 1974, 491 (1974).
Healy and Reed, "Immiscible Microemulsion Flooding", Soc. Petr. Eng. J. 17 (2), 129 (1977).
Foster, "A Low-Tension Waterflooding Process," J. Petr. Tech., Feb. 1973, 205 (1973).
Kamath and Marsden, Jr., "Mobility Control and Micellar-Polymer Flooding," Technology, May 24, 1982, 79 (1982).
McClafflin et al., "The Replacement of Hydrocarbon Diluent With Surfactant and Water for the Production of Heavy, Viscous Crude Oil, in: Proceedings of the Society of Petroleum Engineers of AIME, SPE 10094, pp. 9-22 (1982).

Primary Examiner—Stephen J. Novosad
Assistant Examiner—Bruce M. Kisliuk
Attorney, Agent, or Firm—Pennie & Edmonds

[57] ABSTRACT

A non-thermal, chemical "huff and puff" method for improved oil recovery is provided in which surfactant-/cosurfactant/brine mixtures are used to recover viscous and other hydrocarbons from single wells.

22 Claims, 8 Drawing Figures

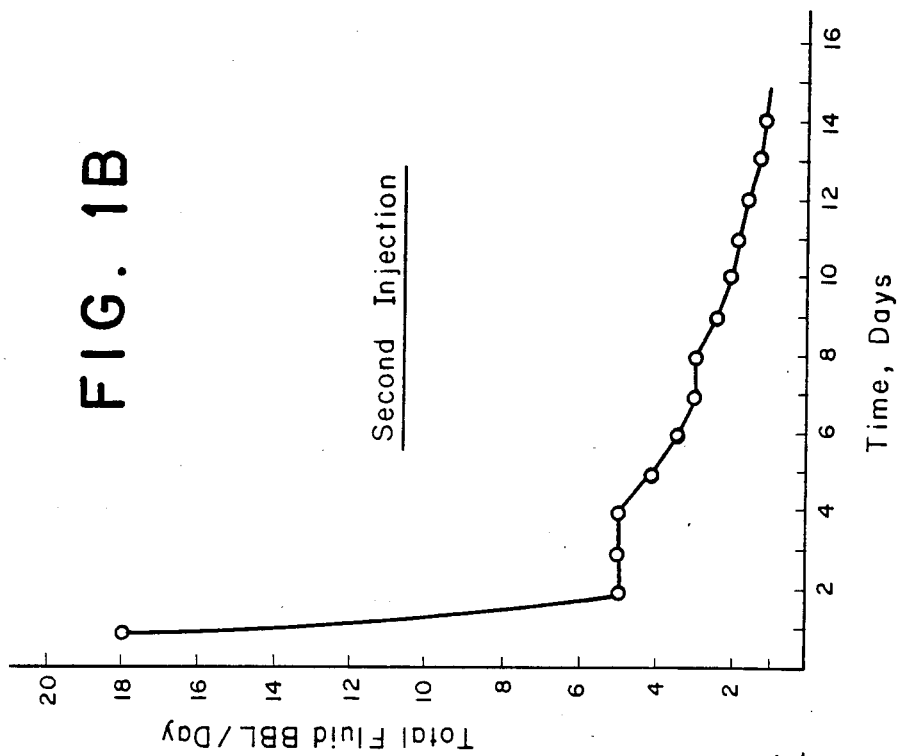
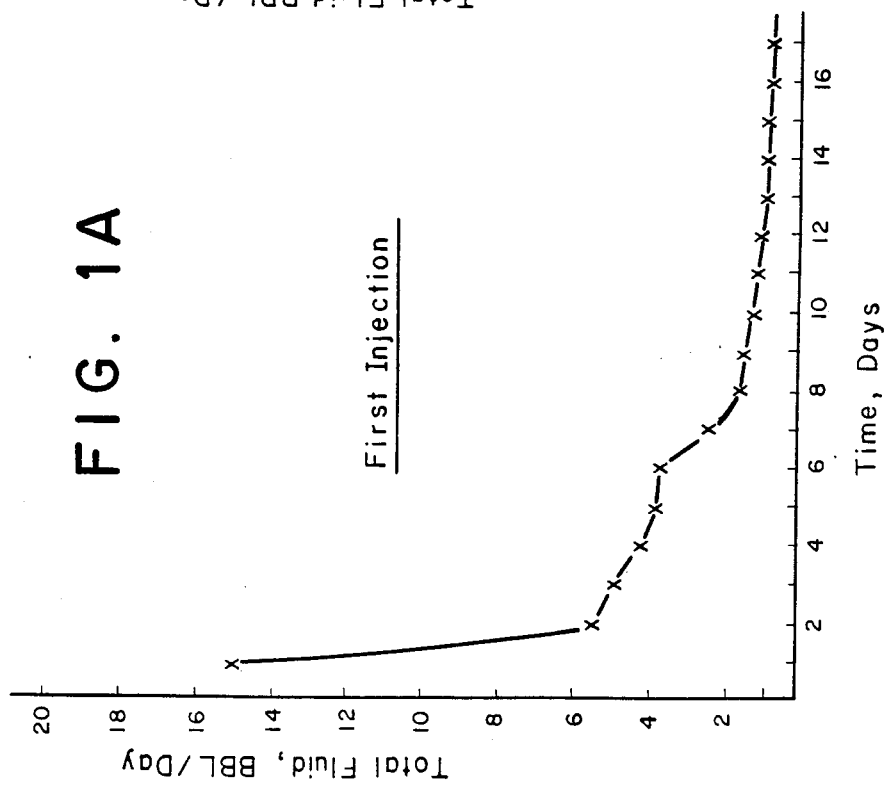

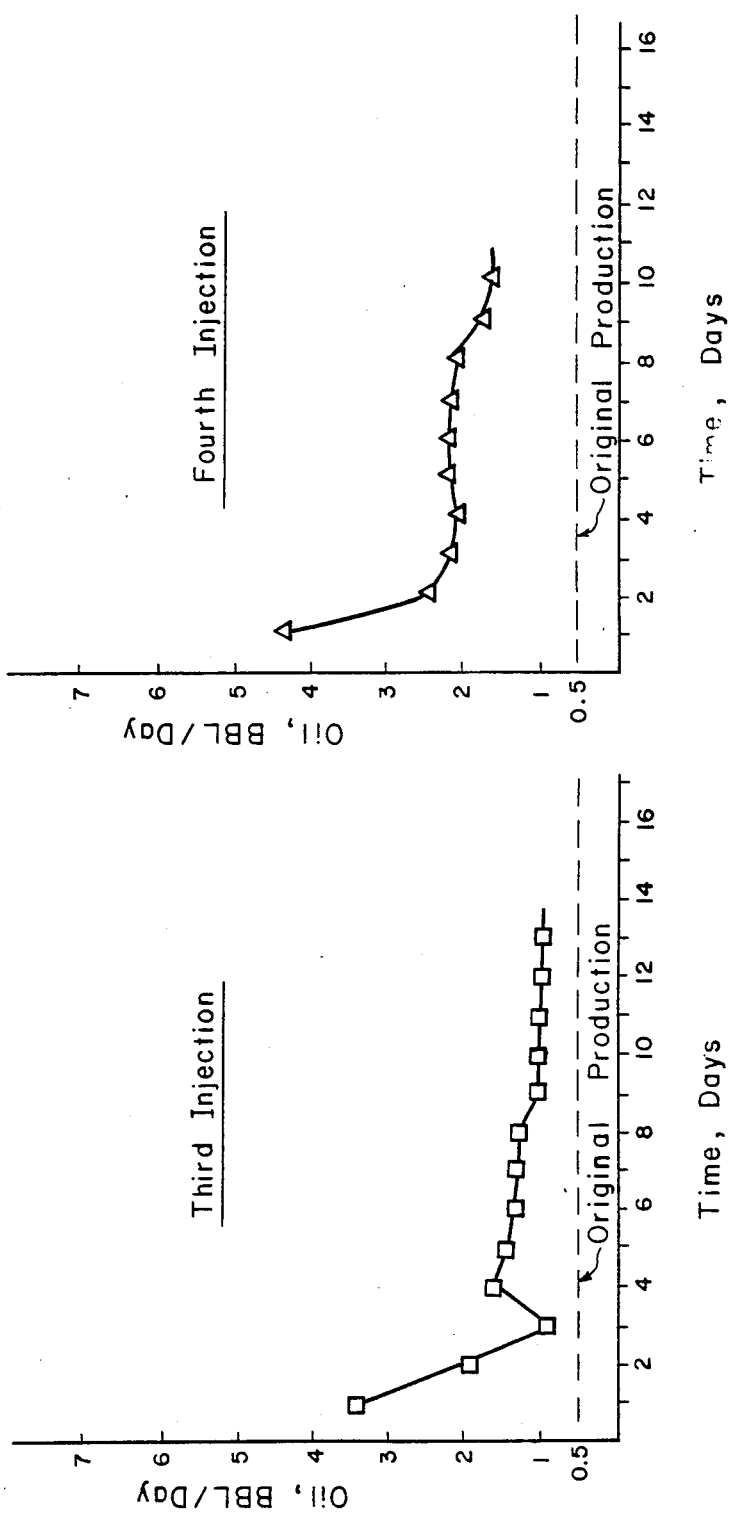

4,706,749

METHOD FOR IMPROVED OIL RECOVERY

TABLE OF CONTENTS

1. Field of the Invention
2. Background of the Invention
3. Summary of the Invention
4. Brief Description of the Figures
5. Detailed Description of the Invention
   5.1. Reservoirs
   5.2. Formulation of Surfactant/Cosurfactant/Brine Mixtures for Improved Oil Recovery
   5.3. Field Use
6. Examples
   6.1. Surfactant Package Formulation
   6.2. Compositions of Crude Oils
   6.3. Compositions of Reservoir Brines
   6.4. Microemulsion Experiments
   6.5. Core Testing
   6.6. Field Tests

1. FIELD OF THE INVENTION

This invention relates to a non-thermal, chemical "huff and puff" method for improved oil recovery based on intra-reservoir emulsion formation. More particularly, this invention relates to the use of aqueous surfactant/cosurfactant/salt solutions to form readily recoverable, low viscosity oil-in-water emulsions, and preferably microemulsions, within subterranean hydrocarbon-bearing formations with little or no natural drive. Significantly, the method can be used to recover viscous hydrocarbons from single wells, i.e., the viscous hydrocarbon can be produced in an emulsified form from the same well into which the emulsion-forming chemicals are injected. In addition, the surfactant/cosurfactant compositions can be recovered and reused.

2. BACKGROUND OF THE INVENTION

Crude oil recovery from subterranean formations generally is classified as either primary, secondary or tertiary recovery. Primary recovery is dependent on the driving forces provided by the gases and connate waters existing in contact with the oil in the reservoir. Before the natural driving forces required for primary recovery are depleted, problems are sometimes encountered which prevent the removal of hydrocarbon from the formation itself or from the wells drilled into it. For example, materials such as paraffins, waxes, asphalts, clays and drilling fluids can accumulate in the formation and the well bore, restricting or blocking the flow of oil. To resolve this problem, methods have been developed which are aimed at dissolving or otherwise removing the flow-restricting materials. Representative of such methods are those described in U.S. Pat. Nos. 3,402,770 and 3,693,719 in which treatment chemicals, sometimes referred to as work-over fluids, are injected into the well bore and into the formation in the immediate vicinity of the well bore for a time sufficient to dissolve or dislodge flow-restricting materials. After this time, oil production under the natural driving forces of the formation can be resumed from the treated well. In U.S. Pat. No. 3,402,770, an organic solvent such as carbon disulfide is used in conjunction with ethylene glycol ethers. In U.S. Pat. No. 3,693,719, hydrolyzable, aprotic, halogenated organic compounds such as allyl chloride are used.

Another problem encountered during primary recovery is poor pumpability of viscous crude oils. Downhole emulsification methods, such as those described in U.S. Pat. Nos. 3,380,531 and 3,467,195 and by G. G. McClaflin et al. in Proceedings of the Society of Petroleum Engineers of AIME, SPE 10094, pp. 9–22 (1982), have been used to improve the pumpability of viscous hydrocarbons. According to these methods, chemicals such as nonionic surfactants, anionic surfactants and/or sodium hydroxide are injected as an aqueous solution into the well bore, as opposed to the formation itself, to form an oil-in-water emulsion near the pump. Because the viscosity of the emulsion is substantially lower than the viscosity of the unemulsified viscous crude oil, it can be pumped to the surface with conventional equipment at increased rates. This permits viscous hydrocarbon in the formation to continue to enter the well bore under primary driving forces where it can be emulsified and recovered.

Following primary recovery, secondary energy sources are required for continued production of oil from hydrocarbon-bearing formations. This usually entails injecting fluids into wells to drive oil out of the reservoir. Typical secondary oil recovery methods are water flooding and immiscible gas flooding. Over time, secondary recovery methods yield less and less oil. Eventually, only the injected fluids are recovered, leaving behind unrecovered oil as a residual oil saturation.

Tertiary oil recovery, also known as enhanced oil recovery (EOR), is recovery of oil which cannot be recovered by either primary or secondary methods. The aim of tertiary oil recovery methods is to reduce oil saturation. One method of achieving this aim is by reducing the viscosity of the oil remaining in the reservoir. Viscosity reduction is achieved through the application of heat or by the injection of fluids that act as solvents.

Tertiary oil recovery methods employing heat have been performed in single wells and are referred to as thermal "huff and puff" methods. A fire flood "huff and puff" method is described in U.S. Pat. No. 3,332,482. According to this method, in situ combustion is allowed to take place in a subterranean formation, thereby generating the heat necessary for viscosity reduction of heavy crude within the formation. Air injection into the well is eventually terminated to extinguish the fire after which the well is open to production.

Other thermal "huff and puff" methods have involved the injection of steam into a formation where it is allowed to soak for a time sufficient to lower the viscosity of the oil remaining in the reservoir. The reduction in viscosity permits the oil to be pumped back out the same well through which steam was injected. There have been numerous variations on the steam "huff and puff" enhanced oil recovery method by which oil/water-miscible solvents, surfactants, organosilicones, bases (e.g., sodium hydroxide or ammonium hydroxide) and demulsifiers have been injected together with the steam. Examples of such methods are disclosed in U.S. Pat. Nos. 3,454,095; 3,459,265; 3,618,666; 3,924,683; 3,951,457; and 3,782,472. As a substitute for steam, hot hydrocarbon vapors have been injected into reservoirs as described in U.S. Pat. Nos. 4,362,213 and 4,407,367.

Reported non-thermal, chemical tertiary oil recovery methods require at least two wells in the same formation, an injection well and a production well. Such methods are generally applicable to reservoirs containing oils of relatively low viscosities. Chemicals, such as nonionic or anionic surfactants in aqueous solutions, are injected in one well to penetrate the formation. As the chemicals move through the reservoir, microemulsions are formed providing low interfacial tensions between the pairs of coexisting equilibrium phases. The mixture is then pumped out of a production well drilled into the same formation. Such a tertiary oil recovery method is referred to as micellar or microemulsion flooding. The basic principle of the process is to reduce the interfacial tension of the trapped reservoir oil by injecting a surfactant solution to achieve a miscible or misciblelike displacement. Residual oil is then mobilized and captured at a production well [R. N. Healy and R. L. Reed, Soc. Petr. Eng. J., October 1974, 491 (1974); Soc. Petr. Eng. J., 17(2):129 (1977)].

In U.S. Pat. No. 3,474,864 a method is described in which a slug of nonionic surfactants such as ethoxylated alcohols and ethoxylated alkylphenols and/or anionic surfactants such as petroleum sulfonates in saline is injected into an injection well which floods through the formation displacing residual oil. The oil is recovered out of a production well. Adsorbed chemicals can be retrieved by flooding water of decreased salinity through the reservoir and recovering the chemicals from the water emerging out of the production well. Micellar flooding methods have also been performed by chasing the injected micellar slug with an aqueous solution of polymers, e.g., polysaccharides or polyacrylamides. This increases the viscosity of the water chase behind the micellar slug and enhances displacement of oil in the reservoir. [For a general discussion of micellar-polymer flooding, see Kirk-Othmer, Encyclopedia of Chemical Technology, 3rd Ed., pp. 174–179 (1982).]

3. SUMMARY OF THE INVENTION

It is an object of the present invention to provide a chemical method for improved recovery of crude oils, particularly heavy, viscous crude oils, from reservoirs with little or no natural drive through single wells. Such a method advantageously eliminates the need for energyintensive application of heat as in thermal "huff and puff" methods as well as the need for separate production wells as in conventional micellar flooding methods.

It is a further object of the invention to provide an economical oil recovery method by which the chemicals employed can be recovered and reused, thereby eliminating the need to replace costly chemicals each time the method is practiced.

The above objects can be achieved by introducing into a single well at ambient temperature an aqueous surfactant/cosurfactant slug of sufficient volume to fill not only the well bore but, more importantly, to penetrate the formation. The surfactant/cosurfactant composition acts to lower the interfacial tension (IFT) between oil and water phases, making the oil recoverable from the same well into which the chemical slug was introduced. The surfactant/cosurfactant composition is preferably one capable of causing formation of a microemulsion upon contact with the hydrocarbon in the reservoir; such microemulsion systems preferably exhibit low interfacial tensions against both the excess oil and excess aqueous phases.

The aqueous surfactant/cosurfactant slug can be "tailored" to the rock or sand formation to be treated, with consideration given both to the nature and composition of the crude oil to be recovered and to the composition of the brine naturally present in the formation. More specifically, surfactant packages and, if necessary, simulated or synthetic brines are formulated which are capable of forming thermodynamically stable, low IFT three-phase systems (oilmicroemulsion-brine) with the particular reservoir crude oil. Upon injection into the formation, a low-viscosity oil-in-water emulsion, preferably a microemulsion, forms underground. The oil is then pumped as an emulsion from the well at significantly improved production rates.

The emulsion so recovered can be broken and the oil separated from the aqueous phase or aqueous and microemulsion phases. Remarkably, the chemicals remain in the aqueous and/or microemulsion phases which can be repeatedly reinjected and recovered, resulting in cost-effective recycling of the surfactant/cosurfactant slug. Recovery and recycle of chemicals is extremely advantageous especially since surfactant loss within the reservoir is one of the most serious problems associated with previously disclosed micellar oil recovery methods.

4. BRIEF DESCRIPTION OF THE FIGURES

Figure 1C:
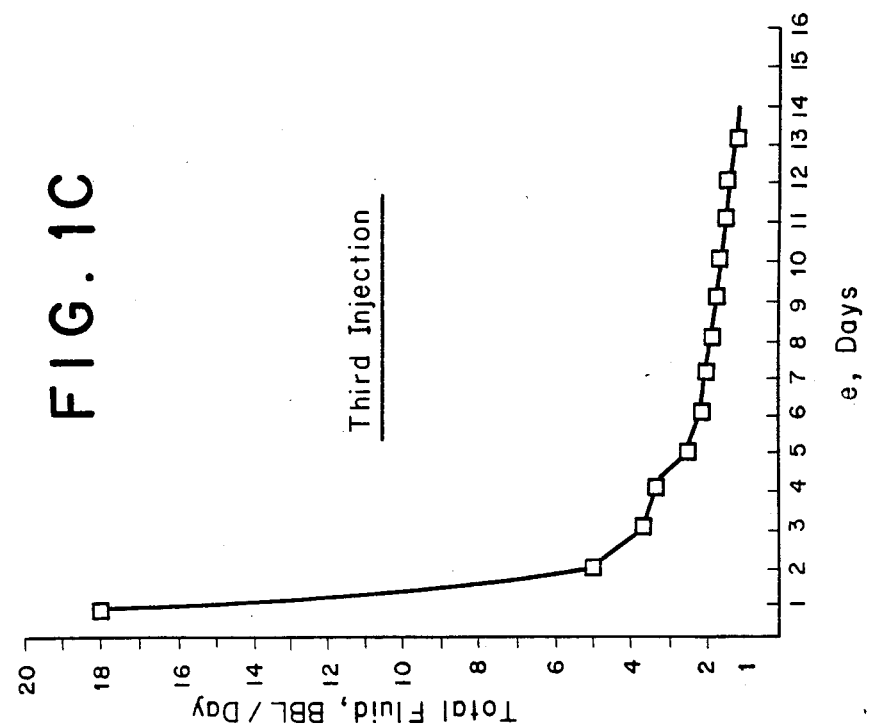

To more fully comprehend the invention, reference should be made to the accompanying figures, in which FIGS. 1A–1D are graphical representations of the production of total fluid from an oil well (Gold Energy field, Allen County, Kans.) as a function of time after stimulation. Each panel, A, B, C, and D, depicts fluid production in barrels per day versus time following each of four injections of treatment chemicals into the same well. The treatment chemicals used in the stimulation depicted in FIG. 1A were reused for the stimulations depicted in FIGS. 1B, 1C and 1D.

Figure 2A:
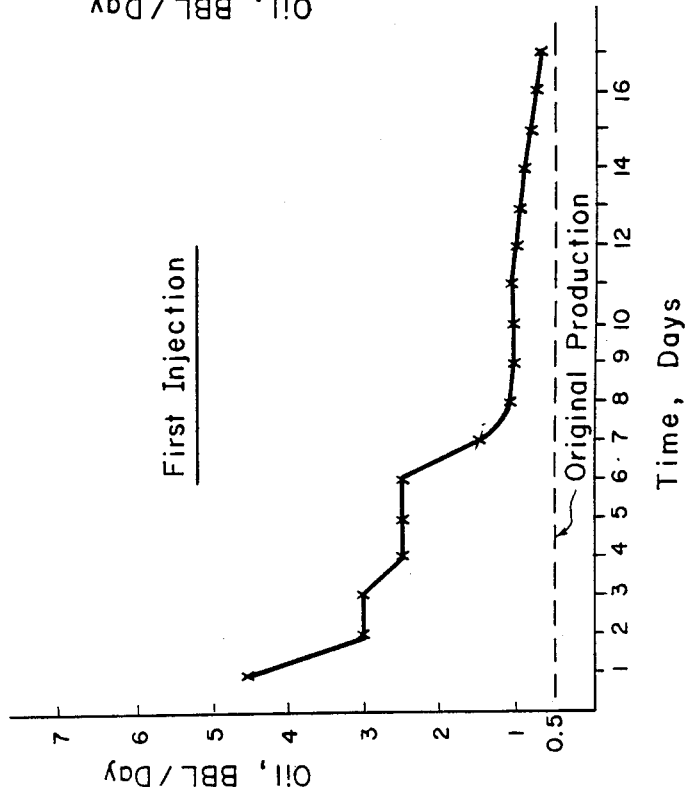
Figure 2B:
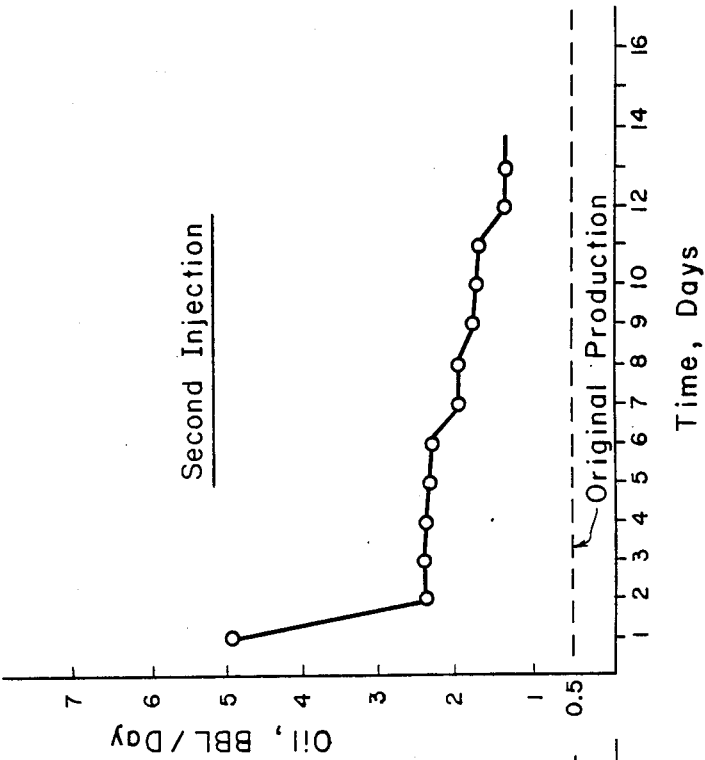

FIGS. 2A–2D are graphical representations of the production of oil from the same oil well as in FIGS. 1A–1D as a function of time after stimulation. Each panel, A, B, C and D, depicts oil production in barrels per day versus time following each of four injections of treatment chemicals into the same well. The treatment chemicals used in the stimulation depicted in FIG. 2A were reused for the stimulations depicted in FIGS. 2B, 2C and 2D.

5. DETAILED DESCRIPTION OF THE INVENTION

5.1. Reservoirs

The method of this invention may be practiced in a variety of reservoir types. For example, the reservoir may be a sand formation or a rock formation. It may be fractured or unfractured. The oil in the reservoir may be heavy or light. The method has been proven useful in an unconsolidated shallow sand formation and is potentially useful in any subterranean reservoir with little or no natural drive, particularly reservoirs with relatively high permeability and relatively high oil/water ratios in the produced fluids. Of course, it is to be appreciated that the success of the method will vary with the specific geology of a particular reservoir; for instance, factors such as reservoir porosity or permeability will influence the extent of penetration of treatment chemicals into the reservoir and the effectiveness of oil displacement.

The method of this invention may be particularly useful in reservoirs with a high degree of natural fracturing in which there is little or no fluid communication between or among wells drilled into the formation. The limited fluid communication means that conventional secondary and tertiary recovery techniques which rely on injection and production wells are not well suited or may not be usable at all in such reservoirs. Hence, the single-well enhanced recovery technique of the present invention is especially useful in reservoirs of this nature.

5.2. FORMULATION OF SURFACTANT/COSURFACTANT/BRINE MIXTURES FOR IMPROVED OIL RECOVERY

It is sufficient for the practice of this invention that the surfactant/cosurfactant/brine mixtures be capable of forming three-phase oil/microemulsion/brine systems under conditions prevailing in the reservoir to be treated. The surfactant packages that can be used in the method of this invention generally comprise an anionic surfactant and a cosurfactant such as an alcohol. Optionally, the surfactant packages can further comprise a non-ionic surfactant. Surfactant packages comprising a nonionic surfactant and an alcohol may also be possible. Classes and subclasses of anionic chemical surfactants potentially useful for the EOR method described herein are listed in Table I. Preferred anionic surfactants are sulfonates, such as petroleum sulfonates and alkylaryl sulfonates. Particularly preferred in the examples given herein were the sodium salts of petroleum sulfonates. The alcohol cosurfactants can be but are not limited to pentanols, butanols, propanols and ethanol. Preferred alcohols are normal propanol (n-propyl alcohol) and isopropanol (isopropyl alcohol).

TABLE I

Classes and Subclasses of Anionic Chemical Surfactants

Carboxylic Acids and Salts
Sulfonic Acids and Salts
   Lignosulfonates
   Alkylbenzenesulfonates
   Alkylbenzenesulfonates, polymerized
   Alkylarylsulfonates, short chain
   Alkylarylsulfonates, polymerized
   Naphthalenesulfonates
   Alkylnaphthalenesulfonates, polymerized
   Naphthalene/formaldehyde condensate polymers
   Petroleum Sulfonates
   Sulfonates with ester, ether, or amide linkages (dialkyl sulfosuccinates)
   Other Sulfonates
Sulfuric Acid Esters and Salts
   Alcohols, sulfated
   Alcohols, ethoxylated and sulfated
   Alkylphenols, ethoxylated and/or sulfated
   Acids, Amides, and Esters, sulfated
   Natural Fats and Oils, sulfated
Phosphoric and Polyphosphoric Acid Esters (and Salts)
   Alcohols and Phenols, alkoxylated and phosphated (and their salts)
   Other Phosphoric and Polyphosphoric Acid Esters (and their salts)
Carboxylic Acid Esters Classes and subclasses of nonionic chemical surfactants which optionally can be included in the surfactant packages used in this invention are listed in Table II. Preferred nonionic surfactants are ethoxylated alkylphenols, particularly those with from 4 to 9 ethoxy groups.

TABLE II

Classes and Subclasses of Nonionic Chemical Surfactants

Alcohols, ethoxylated
Alkylphenols, ethoxylated
Carboxylic Esters, ethoxylated
   Glycerol Esters
   Polyethylene Glycol Esters
   Anhydrosorbitol Esters
   Ethoxylated Anhydrosorbitol and Sorbitol Esters
   Natural Fats and Oils, ethoxylated
   Ethylene and Diethylene Glycol Esters
   Propanediol Esters
   Other Carboxylic Acid Esters
Carboxylic Amides, Ethoxylated
Amines, polyoxyalkylated Surfactant packages used in the method of this invention were tailored to the particular reservoir from which oil was to be recovered. Before a suitable surfactant package was formulated, certain preliminary steps were taken to develop a surfactant package which would yield the lowest interfacial tensions (IFTs) between oil and aqueous phases when a representative "ideal" aliphatic hydrocarbon, hexadecane, and a representative "ideal" aromatic hydrocarbon, toluene, were used individually as oil phases. The surfactant package was developed by varying formulation parameters that are recognized in the art of microemulsion technology as being important for obtaining a formulation with which to achieve stable three-phase systems. [See, e.g., Healy and Reed, supra.] These important parameters include (1) the ratio of anionic to nonionic surfactant; (2) the ratio of the anionic/nonionic surfactants to the cosurfactant; (3) the type of anionic surfactant, its structure and equivalent weight; (4) the type of nonionic surfactant and, if ethoxylated, the number of ethoxy groups present; (5) the salinity of the reservoir brine; (6) the type of cosurfactant; (7) the composition of the hydrocarbon, e.g., the ratio of aromatic components to aliphatic components and/or other components present; and (8) temperature and pressure.

Further surfactant package development required the acquisition of a sample of both the crude oil and the water that naturally exists in the reservoir to be treated. By experiments such as those described in Section 6.4, the surfactant package was refined so that it could be used to form a three-phase system with the crude oil and either the produced water (i.e., the water from the reservoir) or a brine which simulates the produced water at least in terms of salinity.

As is generally known in the art of microemulsion technology, when formulating a surfactant package it is desirable to achieve a stable three-phase system with a bottom phase of essentially surfactant-free water, a middle phase which contains significant concentrations of oil, water and surfactant in equilibrium, and an upper phase of essentially surfactant-free oil. The ideal situation is one in which equal volumes of oil and water are solubilized in the middle phase. It is in this situation that the interfacial tensions of both the oil-middle phase and water-middle phase interfaces are equal, and at this point the maximum tension existing at either interface is at a minimum [Healy and Reed, supra]. If a similar three-phase system is successfully achieved in a reservoir, the result is that a reduction in capillary forces retaining the hydrocarbon within the porous matrix occurs and, as a consequence, the crude oil can be mobilized and removed from the porous reservoir rock.

A preferred surfactant package was tailored to a reservoir beneath a Gold Energy field in Allen County, Kans. near the city of Iola. The composition of the crude oil and the water present in the reservoir are presented in Sections 6.2 and 6.3, respectively. The surfactant package comprises approximately 50% anionic surfactant, approximately 40% alcohol cosurfactant and approximately 10% nonionic surfactant. For the exact composition, see Section 6.1. For this particular crude oil, other surfactant package formulations are possible; the amount of anionic surfactant can range from about 40% to about 70%, the amount of cosurfactant can range from about 10% to about 40%, and the amount of nonionic surfactant can range from about 5% to about 15%, by weight.

The preferred surfactant package of Section 6.1 has been found to be very compatible with most oils with which it has been tested, provided that the saline concentration is of proper strength. These oils can be generally characterized as having any or all, of the follow features: viscosities ranging from about 100 cp to about 1500 cp at ambient reservoir temperature, paraffinic contents ranging from about 42% to about 83%, aromatic contents ranging from about 15% to about 50% and asphaltene contents ranging from about 13% to about 24%.

The salinity of the aqueous phase used to obtain a three-phase microemulsion system with the crude oil of interest, and, ultimately, the salinity of the aqueous slug into which the surfactant package is mixed prior to injection into a reservoir, is very important. It is preferable to use the reservoir brine at full strength so as to avoid changing the characteristics of the well and reservoir to be treated. In situations where the reservoir does not naturally contain a sufficient volume of water, a simulated brine which matches at least the full-strength salinity of the naturally-occurring brine, if not the complete chemical composition, can be used. The use of a more concentrated brine or diluted reservoir brine may have potentially deleterious effects on the formation, e.g., swelling clays within the reservoir thereby diminishing permeability. Accordingly, when formulating a surfactant package that will yield a threephase microemulsion system with the oil of interest, it is preferable to tailor the composition of the surfactant package to the oil and the water in a way that will not require a salinity different from that of the naturally-occurring reservoir water. With these considerations in mind, it is desirable to do a screening of formulation parameters for each particular oil to determine which combination of surfactant, cosurfactant and brine work best in the formation of a three-phase thermodynamically stable microemulsion system. Once the proper system is designed, prior to field use, a core test as described in Section 6.5 is preferably performed.

5.3. Field Use

Using standard mixing and pumping equipment, an appropriate surfactant/cosurfactant/brine mixture is injected into the annulus of the well of a reservoir to be treated. A volume sufficient to penetrate and permeate into the formation, i.e., a volume greater than that required to fill the well bore, and the immediate vicinity thereof, is introduced, usually at the maximum pumping rate consistent with maintaining injection pressure below the formation fracture pressure. Depending on the nature of the reservoir it may be especially critical to keep the injection pressure below the fracture pressure of the formation.

After injection, emulsified crude oil can be pumped from the same well into which the treatment chemicals were injected. The method has been performed successfully both with and without a shut-in and/or circulation period. The emulsion can be broken in a standard oil field emulsion separator and the surfactant/cosurfactant/brine mixture can be recovered and recycled.

The method of this invention has been used successfully in several field tests. Average oil production rates have, in some instances, more than tripled over original production rates and these increased rates have lasted for two weeks or more after injection. Recovery of chemicals after breaking the emulsion has been, in some instances, greater than 95% and to date, the same chemicals have been recycled, i.e., reinjected, as many as seven times with continued successful increased production.

6. EXAMPLES

6.1. SURFACTANT PACKAGE FORMULATION

The composition of the surfactant package used in the experiments and field tests described infra was as follows: 51.1% by weight petroleum sulfonate (TRS 10-410, Witco Chemical Corp.); 11.5% by weight ethoxylated nonylphenol (Tergitol NP-7, Union Carbide Corp.); and 37.4% n-propyl alcohol. Another commercially available anionic surfactant, Petronate TRS 10-80 (Witco Chemical Corp.) which is also a petroleum sulfonate has been used. With regard to nonionic surfactants, nonylphenols were preferred to octylphenols, although the latter have been used. In addition to Tergitol NP-7, Tergitol NP-6 has been used, though with less satisfactory results.

6.2. COMPOSITIONS OF CRUDE OILS

Crude oils obtained from reservoirs that have or may be treated by the method of this invention were characterized as part of a series of microemulsion experiments described in Section 6.4. The chemical characteristics of Altamont crude, Gold Energy crude, Harvey Meyer crude and Middendorf #3 crude are presented in Table III. The characteristics were determined by the following methodology.

The paraffin, asphaltene and aromatic contents of the sample hydrocarbons were obtained by a method in which the hydrocarbons are dispersed in n-heptane, the asphaltenes removed by filtration and the remaining components separated based on their solubilities in n-heptane and methylene chloride. The asphaltene fraction (the precipitate) is filtered from a dispersion of the hydrocarbon in n-heptane. The paraffin fraction is that portion soluble in n-heptane. The aromatic fraction is that portion soluble in methylene chloride.

The materials used are as follows: an analytical balance, accurate to 0.1 milligram (mg), a blender (Osterizer Galaxy 14) and blades fitted to a 500 ml Mason jar, preweighed Whatman #1 paper, filter funnel, rotary evaporation apparatus, a 500 millimeter (mm) burette-type chromatography column, tared collection flasks, reagent grade methylene chloride, n-heptane (99 mole percent) and alumina adsorbent. The alumina was activated by heating it in an oven at 310° C. for 12–14 hours. The alumina was cooled in a dessicator and stored in a tightly capped bottle prior to use. Chromatography columns packed ¾ full were used.

Hydrocarbon samples of 1-2 g were quantitatively added to Mason jars containing 100 ml of n-heptane. After blending for 1-2 minutes at maximum speed, the jar and its contents were washed with an additional 100 ml of n-heptane. The dispersed sample was filtered through Whatman #1 paper and the filtrate colected into Erlenmeyer flasks. After introduction of the filtrate to the column, the effluent was collected into a tared evaporation flask. When n-heptane was completely eluted, 200 ml of methylene chloride was added to the column and the eluted material collected into another tared evaporation flask until the column ran dry.

The eluting solvents were removed using a rotating vacuum evaporator at temperatures appropriate to the solvents.

The tared filter paper and flasks were reweighed and the percentage of asphaltenes, paraffins, and aromatics were calculated based on the original weight of the sample. Individual samples were run in duplicate. All percentages apearing in the foregoing tables for paraffinic, aromatic and asphaltene content have been adjusted to 100% recovery for comparative purposes.

TABLE III

| CRUDE OIL CHEMICAL CHARACTERISTICS | | | |
|---|---|---|---|
| Crude Oil Type | Asphaltene % | Paraffin % | Aromatic % |
| Altamont | 2 | 83 | 15 |
| Gold Energy | ND[1] | 53.5 | 46.5 |
| Harvey Meyer | 35 | 65.7 | ND |
| Middendorf #3 | ND | 52 | 30 |

[1]ND = not determined

Altamont crude is from a field located in the Uinta Basin in northeast Utah in the foothills of the Wasatch Mountains. Gold Energy crude is from a field located in Allen County, Kans., near Iola, Kans. The Middendorf #3 field is similarly geographically located. However, the geological formation beneath each field differs significantly. [See Section 6.6.] The Harvey Meyer crude is from a field located near Iola, Kans.

The Gold Energy crude was also characterized in terms of its specific gravity and viscosity. The specific gravity of Gold Energy crude at 26° C. is 0.94. Its viscosity at 26° C. is 1200 centipoises.

6.3. Compositions of Reservoir Brines

Samples of reservoir waters taken from wells in the Gold Energy, Harvey Meyer and Middendorf fields were analyzed as part of the microemulsion experiments described in Section 6.4. The compositions and characteristics of the three waters are presented in Table IV.

TABLE IV

| RESERVOIR BRINE CHARACTERISTICS | | | |
|---|---|---|---|
| | Reservoir | | |
| TEST | Gold Energy | Harvey Meyer | Middendorf #3 |
| pH | 6.75 | 6.67 | 7.36 |
| Chlorides Salinity | 1.38% | 2.8% | 3.16% |
| Conductivity (as NaCl) | 2.4% | 4.6% | — |
| Calculated (as NaCl) | 2.28% | 4.62% | — |
| Total Hardness | 1740 ppm | 1960 ppm | 5,100 ppm |
| Ca$^{++}$ Hardness | 820 ppm | 420 ppm | 3,600 ppm |
| Barium | — | 24 ppm | — |
| Total S$^=$ as Sulfate | 1 ppm | 8.5 ppm | Trace |
| Total Iron | 42 ppm | 10 ppm | — |

TABLE IV-continued

| RESERVOIR BRINE CHARACTERISTICS | | | |
|---|---|---|---|
| | Reservoir | | |
| TEST | Gold Energy | Harvey Meyer | Middendorf #3 |
| Total Dissolved Solids | 2.65% | 5.2% | 5.77% |
| P Alkalinity | 0 ppm | 0 ppm | — |
| Total Alkalinity | 908 ppm | 32 ppm | — |
| Carbon Dioxide | 100 ppm | 16 ppm | — |
| Dissolved Oxygen | — | — | — |
| Other | Fe$^{++}$, 0.39 ppm | Fe$^{++}$, 0.14 ppm | k$^+$, 433.5 ppm |

6.4 Microemulsion Experiments

Screening to match a surfactant package to a particular oil and brine involved the preparation of microemulsion tubes. Glass pipettes (10 ml, Kimax) were torch-sealed at the bottom. A measured amount of oil, the surfactant package to be tested, and brine were added to the pipette which was then torch-sealed at the top. The pipettes were then shaken approximately 50 times to disperse the oil, water and surfactant. They were allowed to sit for 24 hours after which the volumes of the various phases of the system were recorded.

Several microemulsion screenings were performed with the surfactant package of Section 6.1. Three-phase microemulsion systems were achieved with Gold Energy crude, Middendorf #3 crude, Harvey Meyer crude and Altamont crude.

One screening with Gold Energy crude oil was performed with Gold Energy produced water (brine). The variable was the ratio of brine to surfactant package. The results are presented in Table V. Best results were obtained when the ratio of brine to surfactant was 4:1. The results at the 7:1 ratio were also acceptable.

TABLE V

| MICROEMULSION SCREENING FOR GOLD ENERGY CRUDE AND PRODUCED WATER | | | | | | |
|---|---|---|---|---|---|---|
| Ratio of Brine to Surfactant | Oil (g) | Surfactant (g) | Brine (g) | Upper Phase (ml) | Middle Phase (ml) | Lower Phase (ml) |
| 4:1 | 3.0 | 0.75 | 3.0 | 2.8 | 1.5 | 2.7 |
| 6:1 | 3.0 | 0.5 | 3.0 | 3.1 | 0.8 | 2.9 |
| 7:1 | 3.0 | 0.425 | 3.0 | 2.9 | 0.9 | 2.95 |
| 8:1 | 3.0 | 0.375 | 3.0 | 2.9 | 0.7 | 3.15 |

A further experiment was performed in which sodium chloride was added to the Gold Energy produced water. The results are presented in Table VI. The addition of sodium chloride did not improve microemulsion formation over what could be achieved with the produced water alone.

TABLE VI

| EFFECT OF ADDITION OF NaCl TO GOLD ENERGY PRODUCED WATER ON MICROEMULSIONS | | | | | | |
|---|---|---|---|---|---|---|
| % NaCl Added | Oil (g) | Surfactant (g) | Brine (g) | Upper Phase (ml) | Middle Phase (ml) | Lower Phase (ml) |
| 1 | 3.0 | 0.41 | 3.0 | 2.8 | 0.8 | 3.0 |
| 2 | 3.0 | 0.41 | 3.0 | 2.9 | 0.7 | 3.1 |

A microemulsion screening was performed with Middendorf #3 oil. A first stock solution (Stock Solution #1) containing 4.0 g of the surfactant package of Section 6.1 and 30 g of distilled water and a second stock solution (Stock Solution #2) containing 4.0 g of the surfactant package of Section 6.1 and 30.0 g of 6.0% sodium chloride solution were prepared. The volumes of the stock solutions were changed to vary the final sodium chloride concentration in the microemulsion tubes. The results of this screening are presented in Table VII. Sample E at 4.0% sodium chloride gave the best results.

TABLE VII
MICROEMULSION SCREENING WITH MIDDENDORF #3 OIL

| Sample | Stock Solution #1 (ml) | Stock Solution #2 (ml) | Oil (g) | NaCl (%) | Upper Phase (ml) | Middle Phase (ml) | Lower Phase (ml) |
|---|---|---|---|---|---|---|---|
| A | 3.41 | 0 | 3.0 | 0 | 3.5 | — | 3.1 |
| B | 2.89 | 0.57 | 3.0 | 1 | 3.4 | — | 3.3 |
| C | 2.27 | 1.13 | 3.0 | 2 | 6.4 | — | 0.3 |
| D | 1.70 | 1.70 | 3.0 | 3 | 1.55 | 2.4 | 2.9 |
| E | 1.13 | 2.27 | 3.0 | 4 | 3.2 | 0.9 | 2.6 |
| F | 0.57 | 2.84 | 3.0 | 5 | 3.0 | 0.8 | 2.8 |
| G | 0 | 3.41 | 3.0 | 6 | 3.0 | 0.7 | 2.9 |

Crude oil taken from well #5 of the Harvey Meyer field was screened in a microemulsion test. The composition described in section 6.1 was used as the surfactant package. Several microemulsion pipettes were prepared. The variable under study was the percent dilution of produced water required to achieve a three-phase system. The results are presented in table VIII. A 50–60% dilution of produced water yielded the best three-phase system.

TABLE VIII
MICROEMULSION SCREENING WITH HARVEY MEYER #5 OIL

| Produced Water % Dilution | Oil (g) | Surfactant (g) | Water (g) | Upper Phase (ml) | Middle Phase (ml) | Lower Phase (ml) |
|---|---|---|---|---|---|---|
| 0 | 3.0 | 0.75 | 3.0 | 3.9 | — | 3.3 |
| 10 | 3.0 | 0.81 | 3.0 | 3.5 | — | 3.7 |
| 20 | 3.0 | 0.75 | 3.0 | 2.8 | 0.5 | 4.1 |
| 30 | 3.0 | 0.75 | 3.0 | 3.0 | 0.2 | 4.0 |
| 40 | 3.10 | 0.75 | 3.10 | 3.2 | 2.4 | 1.6 |
| 50 | 3.0 | 0.75 | 3.0 | 3.1 | 1.8 | 2.1 |
| 60 | 3.0 | 0.75 | 3.0 | 3.4 | 1.3 | 2.4 |
| 70 | 3.0 | 0.75 | 3.0 | 3.2 | 1.4 | 2.6 |
| 80 | 3.0 | 0.75 | 3.0 | 3.2 | 1.4 | 2.6 |
| 90 | 3.0 | 0.75 | 3.0 | 3.1 | 1.3 | 2.6 |
| 100 | 3.0 | 0.75 | 3.0 | 3.1 | 1.3 | 2.6 |
| 1% NaCl add'n | 3.0 | 0.80 | 3.0 | 3.1 | 1.2 | 2.8 |
| 2% NaCl add'n | 3.0 | 0.75 | 3.0 | 3.2 | 1.2 | 2.8 |

Microemulsion screening was performed with crude oil taken from the Altamont field. The surfactant package used was as described in Section 6.1. The variable studied was brine salinity. In these experiments a "synthetic" brine was made with sodium chloride. The results are presented in Table IX which shows that brines containing 4–5% sodium chloride yielded the best three-phase systems.

TABLE IX
MICROEMULSION SCREENING WITH ALTAMONT CRUDE OIL (AT 160° F.)

| Tube # | % NaCl in brine | Oil (g) | Surfactant (g) | Brine (g) | Upper Phase (ml) | Middle Phase (ml) | Lower Phase (ml) |
|---|---|---|---|---|---|---|---|
| 1 | 1 | 3.0 | 1.0 | 4.0 | 5.0 | — | 4.9 |
| 2 | 2 | 3.0 | 1.0 | 4.0 | 4.0 | — | 5.0 |
| 3 | 3 | 3.0 | 1.0 | 4.0 | 4.0 | — | 5.25 |
| 4 | 4 | 3.0 | 1.0 | 4.0 | 4.0 | 2.5 | 2.7 |
| 5 | 5 | 3.0 | 1.0 | 4.0 | 3.8 | 1.65 | 3.35 |
| 6 | 6 | 3.0 | 1.0 | 4.0 | 5.1 | 1.4 | 3.8 |
| 7 | 7 | 3.0 | 1.0 | 4.0 | 5.1 | 1.3 | 3.6 |
| 8 | 8 | 3.0 | 1.0 | 4.0 | 3.9 | 1.25 | 3.75 |
| 9 | 9 | 3.0 | 1.0 | 4.0 | 5.1 | 1.25 | 3.65 |
| 10 | 10 | 3.0 | 1.0 | 4.0 | 5.0 | 1.15 | 3.8 |
| 11 | 11 | 3.0 | 1.0 | 4.0 | 5.1 | 1.1 | 3.8 |
| 12 | 12 | 3.0 | 1.0 | 4.0 | 3.9 | 1.1 | 3.85 |
| 13 | 13 | 3.0 | 1.0 | 4.0 | 3.7 | 1.1 | 3.7 |
| 14 | 14 | 3.0 | 1.0 | 4.0 | 3.7 | 1.05 | 3.75 |
| 15 | 15 | 3.0 | 1.0 | 4.0 | 3.8 | 1.1 | 3.75 |

Finally, crude oil from a Lynn County field located in Kansas was screened for microemulsion formation, varying the salinity of the produced water, with the composition of Section 6.1. The composition of Lynn County crude oil is approximately 49% paraffinic and approximately 27% aromatic. It has a viscosity at room temperature of about 19,000 cp. The composition of the produced water is as follows: 1.4% chlorides; 2.3% total dissolved solids; pH 6.7; total hardness (as $CaCO_3$), 1,400 ppm; $Ca^{++}$ hardness, 850 ppm (as $CaCO_3$). No acceptable three-phase systems were achieved indicating that either a different surfactant package than that of Section 6.1 or a higher temperature would by required for microemulsion formation with the is type of crude oil.

6.5. Core Testing

The core test was designed to simulate an oil reservoir and was performed as follows. Filter cups [Nalgene Sterilization Filter Unit Type S (115 ml), 0.45 micron grid] were taken and ten small holes were evenly punched into each utilizing a 3 ml syringe [Becton, Dickinson Co., 3 ml, 236 syringe and needle]. After this was done, 56 grams of dried and washed sand (in this case, Amelia Island, Florida beach sand) and 9 grams of crude oil were mixed together. Sixty grams of the mixture were placed in a filter cup and packed down using a 50 ml beaker or the equivalent. The surfactant/cosurfactant/brine mixture to be used in the field, as determined by experiments such as those in Section 6.4, was prepared. For example, 60 grams of produced brine and 15 grams of the surfactant package of Section 6.1 were prepared for use in a core test with Gold Energy crude oil.

Seventy-five grams of the surfactant/cosurfactant/brine mixture were applied on top of the oil-sand mixture in the filter cup and allowed to run through into a graduated cylinder. The amount of oil recovered in the collected diluent was observed as were the characteristics of the emulsion. The whiteness of the sand which remains in the filter cups was also observed. The results of the core test provide a guideline as to whether any further refinements need to be made before actual field testing.

6.6. FIELD TESTS

A well penetrating the formation beneath the Gold Energy field as described in Section 6.2 was treated. This well is a 2 ⅞" completion with a 22 foot perforated completion zone. The reservoir is an unconsolidated Lower Bartlesville sand. The well has never been fractured. Permeability of the reservoir is about 1000 millidarcies. The oil is about 20° API with a viscosity of approximately 1200 centipoises at the reservoir temperature of approximately 74° F. The surfactant package used was that described in Section 6.1.

A 7:1, produced water:surfactant package mixture was prepared and 50 barrels were injected into the reservoir. The mixture was injected at a rate of approximately 0.5-1 barrels per minute (bbl/min.) down the annulus of the well. Since the sand in this formation is unconsolidated it was critical to keep the injection pressure below the fracture pressure in the formation. [This well had been treated in a similar manner four months prior to this injection. At the time of the initial treatment, it was recognized that the increased production following this initial treatment may have been attributable either to microemulsion formation in the reservoir, as demonstrated in subsequent field tests, or to "cleaning" of the well bore and the formation in the immediate vicinity of the well bore.]

After injection, the emulsified crude was pumped from the same well. Emulsion production began about six hours after injection. The emulsion was broken in the separator and the surfactant/cosurfactant/produced water mixture recovered. To date this same chemical has been recycled seven times. The original production from the well was 0.5 bbl/day or 15 bbl/month. The treatment of this well has produced about 50 bbl/month with an average of two reinjections per month. Fluid and oil production following four injections are depicted in FIGS. 1 and 2. No optimization of the injection timing was made. This test was designed to test the life of the chemical. No appreciable change in the chemical was observed over a four month period.

This process has allowed an average production increase of 3.3:1 over the original production. Daily production rates of oil have been as high as 15:1 in the days immediately following reinjection.

Another field test was performed in the Middendorf #3 well. This required the use of the surfactant package of Section 6.1 in a synthetic brine since there were insufficient quantities of produced water. The salinity of the produced water was matched using potassium chloride. About two months after an initial treatment injection of 6 (net 54 gallons) drums of the surfactant package of Section 6.1 diluted (1:8) with 63 barrels of water and 950 lbs. of potassium chloride; the well was reinjected with chemicals recovered from the previous injection, and emulsion was then produced. Oil production was increased by one barrel per day more than the well's original production rate, i.e., an increased daily production of 20%. This field test, while technically successful, is not considered as economical as the Gold Energy test. Differences in results may be attributable to the geological differences in the formations beneath the Gold Energy and Middendorf fields as presented in Table X.

TABLE X

CHARACTERISTICS OF GOLD ENERGY AND MIDDENDORF RESERVOIRS

| Characteristic | Gold Energy | Middendorf |
|---|---|---|
| Depth (ft) | 920–950 | 817 |
| Permeability (mD) | 1031 | 45 |
| Oil Saturation (%) | 49 | 60 |
| Water Saturation (%) | 20 | 20 |
| Oil Content (bbls/acre-ft) | 1677 | 858 |
| Porosity (%) | 28 | 19 |

It is apparent that many modifications and variations of this invention as hereinabove set forth may be made without departing from the spirit and scope thereof. The specific emobodiments described are given by way of example only and the invention is limited only by the terms of the appended claims.

We claim:

1. A non-thermal, single-well method for improved oil recovery from a hydrocarbon-bearing reservoir with essentially no natural drive in which:
   (a) a volume of a chemical surfactant/cosurfactant/brine mixture, greater than a volume required to fill the well bore and immediate vicinity thereo into a well penetrating the reservoir, which surfactant/cosurfactant/brine mixture is preformulated to produce a stable, low interfacial tension, three-phase, hydrocarbon-microemulsion-brine system with a sample of the hydrocarbon of the reservoir;
   (b) a subterranean, intra-reservoir, low interfacial tension, three-phase, hydrocarbon-microemulsion-brine system is formed; and
   (c) the low interfacial tension, three-phase, hydrocarbon-microemulsion-brine system is produced from the same well into which the surfactant/cosurfactant/brine mixture is injected.

2. The method according to claim 1 in which the hydrocarbon phase of the three-phase, hydrocarbon-microemulsion-brine system is subsequently separated from the microemulsion and brine phases and the microemulsion and brine phases are recovered and substituted for the chemical surfactant/corsurfactant/brine mixture in a subsequent performance of the method according to claim 1.

3. The method according to claim 1 in which the surfactant/cosurfactant/brine mixture comprises a surfactant package in water produced from the reservoir.

4. The method according to claim 1 in which the surfactant/cosurfactant/brine mixture comprises a surfactant package in a simulated brine formulated to have a salinity which is the same as the salinity of water naturally existing in the reservoir.

5. The method according to claim 1 in which the surfactant/cosurfactant/brine mixture comprises a surfactant package in a synthetic brine having a salinity differing from the salinity of water in the reservoir, so formulated to achieve a stable, three-phase, hydrocarbon-microemulsionbrine system.

6. The method according to claim 3, 4 or 5 in which the surfactant package comprises a nonionic surfactant and an alcohol.cosurfactant.

7. The method according to claim 3, 4 or 5 in which the surfactant package comprises an anionic surfactant and an alcohol cosurfactant.

8. The method according to claim 7 in which the surfactant package further comprises a nonionic surfactant.

9. The method according to claim 8 wherein the anionic surfactant is a sulfonate and the nonionic surfactant is an alkylphenol.

10. The method according to claim 3, 4 or 5 in which the surfactant package comprises about 40% to about 70% by weight of an anionic surfactant, about 10% to about 40% by weight of a nonionic surfactant and about 5% to about 15% by weight of a cosurfactant.

11. The method according to claim 3, 4 or 5 in which the surfactant package comprises about 50% by weight of petroleum sulfonate, about 10% by weight of ethoxylated nonylphenol having about 7 ethoxy groups and about 40% by weight of n-propyl alcohol.

12. The method according to claim 1 in which the hydrocarbon in the reservoir has a viscosity from about 100 to about 1500 centipoise at ambient reservoir temperature.

13. The method according to claim 1 in which the hydrocarbon has a paraffinic content from about 42% to about 83% by weight and an aromatic content from about 15% to about 50% by weight.

14. The method according to claim 1 in which the hydrocarbon has a viscosity of about 1200 centipose at 26° C., a paraffinic content of about 54% by weight and an aromatic content of about 46% by weight.

15. The method according to claim 1 in which the hydrocarbon is selected from the group consisting of Gold Energy crude oil, Middendorf #3 crude oil, Harvey Meyer crude oil and Altamont crude oil.

16. The method according to claim 1 in which the reservoir is a subterranean shallow rock formation.

17. The method according to claim 1 in which the reservoir is a subterranean shallow sand formation.

18. The method according to claim 1 in which the reservoir has a high degree of natural fracturing such that there is substantially no fluid communication among wells drilled into the reservoir.

19. The method according to claim 1 in which the surfactant/cosurfactant/brine mixture is injected into the well at a pressure less than the fracture pressure of the reservoir.

20. The method according to claim 1 in which hydrocarbon is produced from the well at an average rate of about three times the original rate of hydrocarbon production during a period of about two weeks after injection of the surfactant/cosurfactant/brine mixture.

21. The method according to claim 2 in which the percent recovery of surfactant/cosurfactant in the brine after breaking the hydrocarbon-in-water emulsion is about 95% or greater.

22. A non-thermal, single-well method for improved recovery of a viscous hydrocarbon from a shallow subterranean resevoir with essentially no natural drive in which:

(a) a volume of a mixture of a surfactant package comprising about 50% by weight of petroleum sulfonate, about 10% by weight of ethoxylated nonylphenol with about 7 ethoxy groups and about 40% by weight of n-propyl alcohol in produced water or a simulation thereof, such mixture being preformulated to produce a stable, low interfacial tension, three-phase, hydrocarbon-microemulsion-produced water system with a sample of the viscous hydrocarbon of the reservoir, such volume being greater than a volume required to fill the well bore and immediate vicinity thereof and sufficient to permeate into the reservoir, is injected into a well penetrating the resevoir;

(b) a subterranean, intra-reservoir, low interfacial tension, three-phase, hydrocarbon-microemulsion-produced water system is formed; and (c) the low interfacial tension, three-phase, hydrocarbon-microemulsion-produced water system is produced from the same well into which the surfactant package/aqueous mixture is injected.

\* \* \* \* \*